(12) United States Patent
Shimakura

(10) Patent No.: US 6,746,634 B2
(45) Date of Patent: Jun. 8, 2004

(54) VEHICULAR LAMP AND INJECTION MOLD AND MANUFACTURING METHOD FOR LAMP BODY OF VEHICULAR LAMP

(75) Inventor: Kouji Shimakura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 57 days.

(21) Appl. No.: 10/118,165

(22) Filed: Apr. 9, 2002

(65) Prior Publication Data

US 2002/0145882 A1 Oct. 10, 2002

(30) Foreign Application Priority Data

Apr. 10, 2001 (JP) ........................................ 2001-110753

(51) Int. Cl.[7] .............................................. B29D 11/00
(52) U.S. Cl. .................... 264/1.9; 264/328.7; 425/190; 425/542; 425/808
(58) Field of Search ............................. 264/1.9, 328.7; 425/190, 542, 808; 249/102

(56) References Cited

U.S. PATENT DOCUMENTS

| | | | |
|---|---|---|---|
| 3,258,840 A | * 7/1966 | Hedgewick et al. | ........ 228/162 |
| 3,409,344 A | * 11/1968 | Balint et al. | ................. 359/531 |
| 4,747,981 A | * 5/1988 | Robinson | ..................... 264/1.9 |
| 5,413,743 A | * 5/1995 | Prophet | ........................ 264/1.7 |
| 6,024,474 A | 2/2000 | Tanaka | |
| 6,059,433 A | 5/2000 | Otaka et al. | |
| 6,200,006 B1 | 3/2001 | Natsume et al. | |

* cited by examiner

Primary Examiner—James P. Mackey
Assistant Examiner—Donald Heckenberg
(74) Attorney, Agent, or Firm—Sughrue Mion, PLLC

(57) ABSTRACT

A vehicular lamp and injection mold and manufacturing method for lamp bodies for producing a plurality of different types of vehicular lamps while resulting in a reduced cost of manufacturing due to sharing of a common injection mold. A lamp body of a tail lamp, for example, includes a reflective surface for reflecting light from a light source bulb forward and is formed with a bulb attachment hole for mounting the light source bulb constituted by an insert-molded surface. That is, part of a reflective surface of the lamp body is formed by an insert-molded surface molded with a cavity surface of an insert constituting a part of a fixed mold of an injection mold. To change to molding a different type of lamp body, it is only necessary to change the insert.

5 Claims, 6 Drawing Sheets

VEHICULAR LAMP AND INJECTION MOLD AND MANUFACTURING METHOD FOR LAMP BODY OF VEHICULAR LAMP

BACKGROUND OF THE INVENTION

The present invention relates to a vehicular lamp and to an injection mold and manufacturing method for a lamp body of the same.

Many types of vehicular lamps such as a rear fog lamp and a tail lamp are configured such that the lamp body thereof includes a reflective surface for reflecting light from a light source bulb forward, and the lamp body is formed with a bulb attachment hole for mounting the light source bulb to the lamp body.

These lamps can vary in light distribution performance depending on the type of lamp even though their appearance may be the same. Therefore, lamp bodies with various shapes of the reflective surface and the bulb attachment hole must be manufactured in accordance with the type of lamp.

A lamp body is typically constituted by an injection molded product. The need for manufacturing a different lamp body for each type of lamp requires a plurality of types of injection molds, which is a major factor in increasing the cost of manufacturing such lamps.

It is possible to use a common lamp body if the lamp body is configured such that a separate reflector can be attached to the reflective surface of the lamp body, in which case the choice of whether or not to provide the reflector is made depending on the type of lamp. For example, when a lamp body which has been designed for a tail lamp is carried over to a rear fog lamp, it is possible to use the same lamp body for a rear fog lamp by attaching a suitable reflector to the reflective surface of the lamp body.

According to this arrangement, however, a different reflector is required depending on the type of lamp, which causes an increase in the number of parts and results in a problem of increased lamp cost.

Considering the foregoing, it is an object of the present invention to provide a vehicular lamp, and an injection mold for a lamp body and a manufacturing method for the same, whereby, when manufacturing a lamp body for a plurality of types of lamps by injection molding, the cost of manufacturing the lamps is reduced by employing a common injection mold.

SUMMARY OF THE INVENTION

The present invention aims to accomplish the aforementioned object with a configuration such that a part of a reflective surface is molded with a cavity surface of an insert.

More specifically, a vehicular lamp according to the present invention includes a light source bulb, a lamp body including a reflective surface for reflecting light from the light source bulb forward and being formed with a bulb attachment hole for mounting the light source bulb to the lamp body, and a translucent cover attached to the lamp body so as to form a lamp chamber with the lamp body, wherein the lamp body is constituted by an injection molded product, and a part of the reflective surface of the lamp is constituted by an insert-molded surface molded with a cavity surface of an insert constituting a part of a fixed mold or a movable mold of an injection mold.

Further, an injection mold for a lamp body according to the present invention, which is intended for use in manufacturing by injection molding a lamp body of a vehicular lamp including a reflective surface for reflecting light from a light source bulb forward and being formed with a bulb attachment hole for attaching the light source bulb, is characterized in that one of a fixed mold and a movable mold for forming a cavity with a shape corresponding to the lamp body is constituted by a mold body and an insert detachably attached to the mold body, and a part of the reflective surface is molded by the cavity surface of the insert.

Still further, a method according to the present invention for manufacturing a lamp body by injection molding a lamp body of a vehicular lamp including a reflective surface for reflecting a light from the light source bulb forward and being formed with a bulb attachment hole for attaching the light source bulb, is characterized in that one of a fixed mold and a movable mold for forming a cavity with a shape corresponding to the lamp body is configured such that the insert is detachably attached to the mold body, and a part of the reflective surface is molded by the cavity surface of the insert.

The type of vehicular lamp to which the invention may be applied is not particularly limited, and can be, for example, a rear fog lamp, a tail lamp, a tail and stop lamp, a turn signal lamp, a cornering lamp, a clearance lamp, a fog lamp, a driving lamp, or a headlamp, or the like.

The aforementioned reflective surface may be constituted by a single curved surface, a plurality of curved surfaces smoothly connected with each other, or a plurality of reflective elements.

In addition, the alignment, shape, size and the like of the aforementioned part of the reflective surface is not particularly limited.

The translucent cover may be a plain one, a cover on which lens elements are formed, or a colorless or colored cover.

A vehicular lamp according to the present invention is configured such that the lamp body thereof is constituted by an injection molded product which includes a reflective surface for reflecting light from a light source bulb forward and is formed with a bulb attachment hole for attaching the light source bulb. Because a part of the reflective surface of the lamp body is constituted by an insert-molded surface molded by a cavity surface of the insert constituting a part of a fixed mold or a movable mold of an injection mold, the following advantageous effects can be obtained.

Namely, if injection molding is performed using inserts with different cavity surface shapes, it is possible to manufacture a lamp body with partially different reflection surface shapes while sharing a common main structure for the injection mold. This enables a plurality of types of lamp bodies with different light distribution performance to be obtained.

Therefore, by preparing a plurality of types of inserts having a cavity surface with a predetermined shape corresponding to the light distribution performance of the lamp, and performing injection molding by switching the insert depending on the type of lamp, a plurality of types of lamp bodies can be obtained corresponding to a desired light distribution performance of the lamp without the need to provide a separate reflector for each type of lamp, as in a conventional case.

Accordingly, when manufacturing a plurality of types of lamp bodies by injection molding, the present invention can reduce the cost of manufacturing a lamp by using a common injection mold, and consequently can reduce the cost of a lamp by eliminating the necessity to increase the number of parts.

Moreover, if the bulb attachment hole is also constituted by the insert-molded surface, it is possible to easily mount different types of light source bulbs corresponding to the light distribution performance of the lamp. Further, because a protruding portion is formed on the insert, it is possible to easily attach and detach the insert.

In the aforementioned configuration, if a reflective surface of the lamp body is constituted by a plurality of reflective elements, the following effects can be obtained.

Namely, when the reflective surface of the lamp is constituted by smooth curved surfaces, if only the shape of the insert-molded surface is changed, the thickness of the lamp body will be greatly changed in part from a basic thickness. As a result, shrinkage is likely to occur on the reflective surface, or the flowability of the molten resin is likely to decrease during injection molding.

On the contrary, when the reflective surface of the lamp body is constituted by a plurality of reflective elements, when only the shape of the insert-molded surface is changed, the change in shape occurs in each reflective element, preventing the basic thickness from being greatly changed. Therefore, the occurrence of shrinkage in the reflective surface or a decrease in the flowability of the molten resin during injection molding can be effectively reduced.

Moreover, if the position of the boundary between the insert-molded surface and other parts of the reflective surface is substantially the same as the position of the boundary between the various reflective elements, the profile of the insert formed on the reflective surface by injection molding can be made less conspicuous.

Further, in this configuration, if the translucent cover is constituted by a red-colored translucent cover and the lamp is a rear fog lamp, a tail lamp, or a tail and stop lamp that is designed to emit red light, the light distribution performance for each lamp can be easily ensured by switching the insert based on the use of a common translucent cover.

DESCRIPTION OF THE PREFERRED EMBODIMENTS

Figure 1:
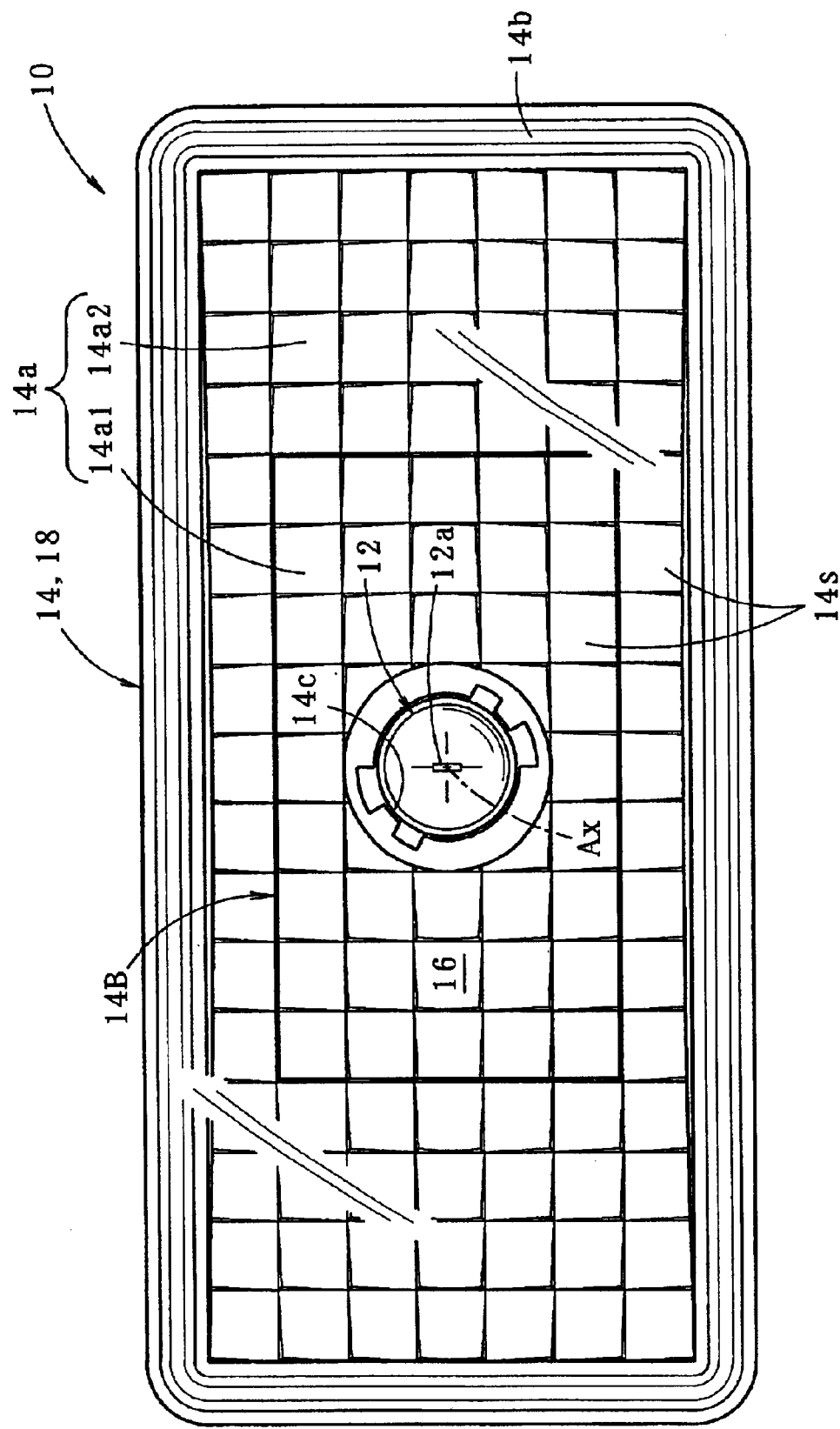
FIG. 1 is a front view of a tail lamp according to a preferred embodiment of the present invention.

Hereinafter, referring to the drawings, preferred embodiments of the present invention will be explained.

Figure 2:
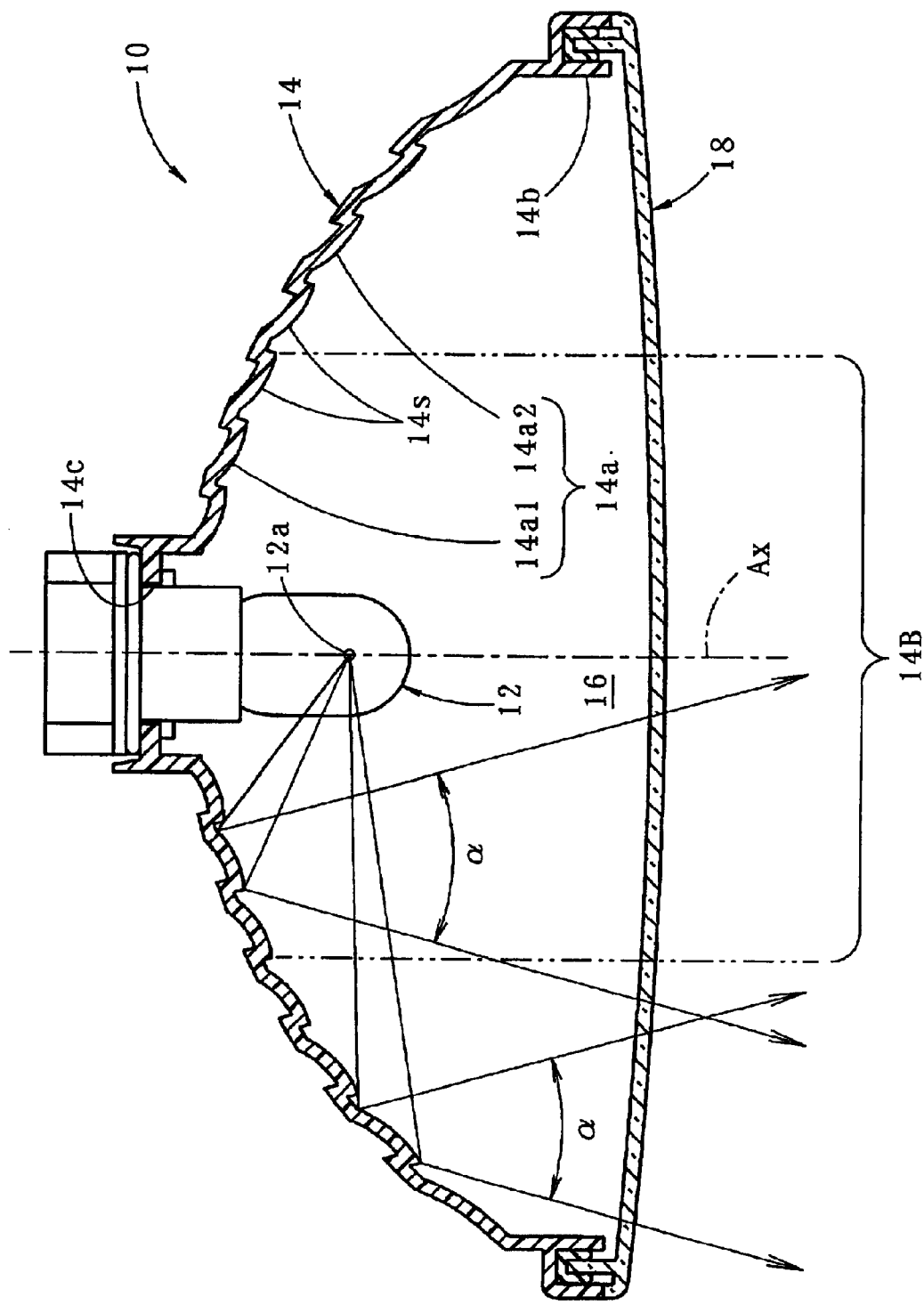
FIG. 2 is a horizontal cross-sectional view showing the tail lamp of FIG. 1.
Figure 3:
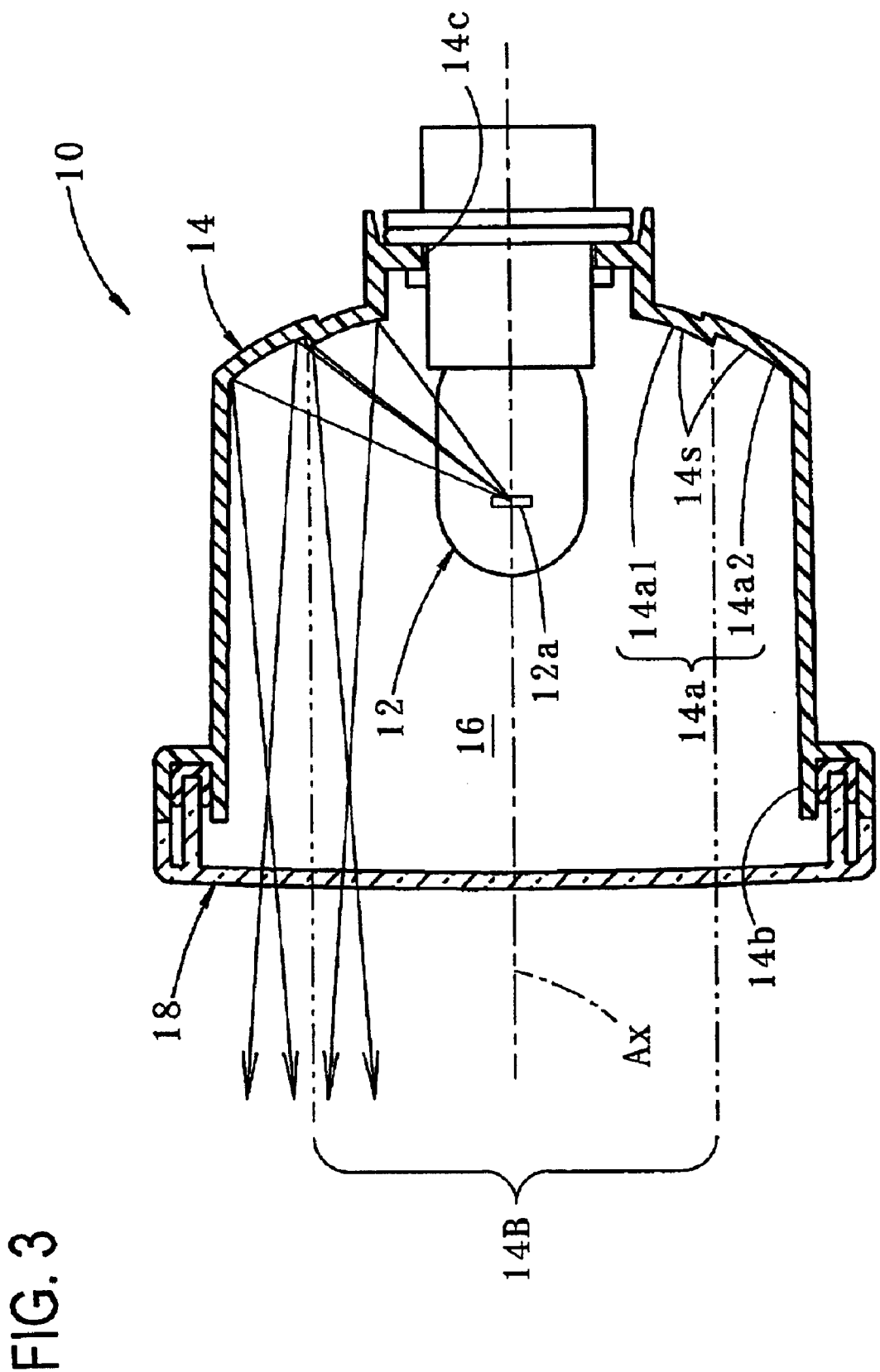
FIG. 3 is a vertical cross-sectional view showing the tail lamp of FIG. 1.

FIG. 1 is a front view showing a vehicular lamp 10 produced according to preferred embodiment of the present invention. FIG. 2 and FIG. 3 are a horizontal sectional view and vertical sectional view thereof, respectively.

As shown in these drawings, the vehicular lamp 10 according to this embodiment is a tail lamp with an oblong rectangular profile shape. The vehicular lamp 10 includes a light source bulb 12 mounted on an optical axis Ax extending in the longitudinal direction of the vehicle, a lamp body 14 for supporting the light source bulb 12, and a translucent cover 18 attached to a front end opening 14b of the lamp body 14 so as to form a lamp chamber 16 with the lamp body 14 and colored so as to emit red light.

The lamp body 14, constituted by an injection-molded product made of synthetic resin, includes a reflective surface 14a for reflecting light from a filament 12a of the light source bulb 12 forward, and is formed with a bulb attachment hole 14c for mounting the light source bulb 12 at a rear apex portion thereof.

The translucent cover 18 is a plain, red-colored translucent cover. The function of controlling the light distribution of the lamp is provided by the reflective surface 14a of the lamp body 14.

Namely, the reflective surface 14a is constituted by a plurality of reflective elements 14s arranged in a two-dimensional grid. Each reflective element 14s has a convex horizontal cross-sectional shape and a concave vertical cross-sectional shape, and is configured to diffuse and reflect light from the light source bulb 12 in lateral and longitudinal directions, as shown in FIGS. 2 and 3 by arrows. A right and left diffusion and reflection angle for each reflection element 14s is set at an angle α.

Figure 4:
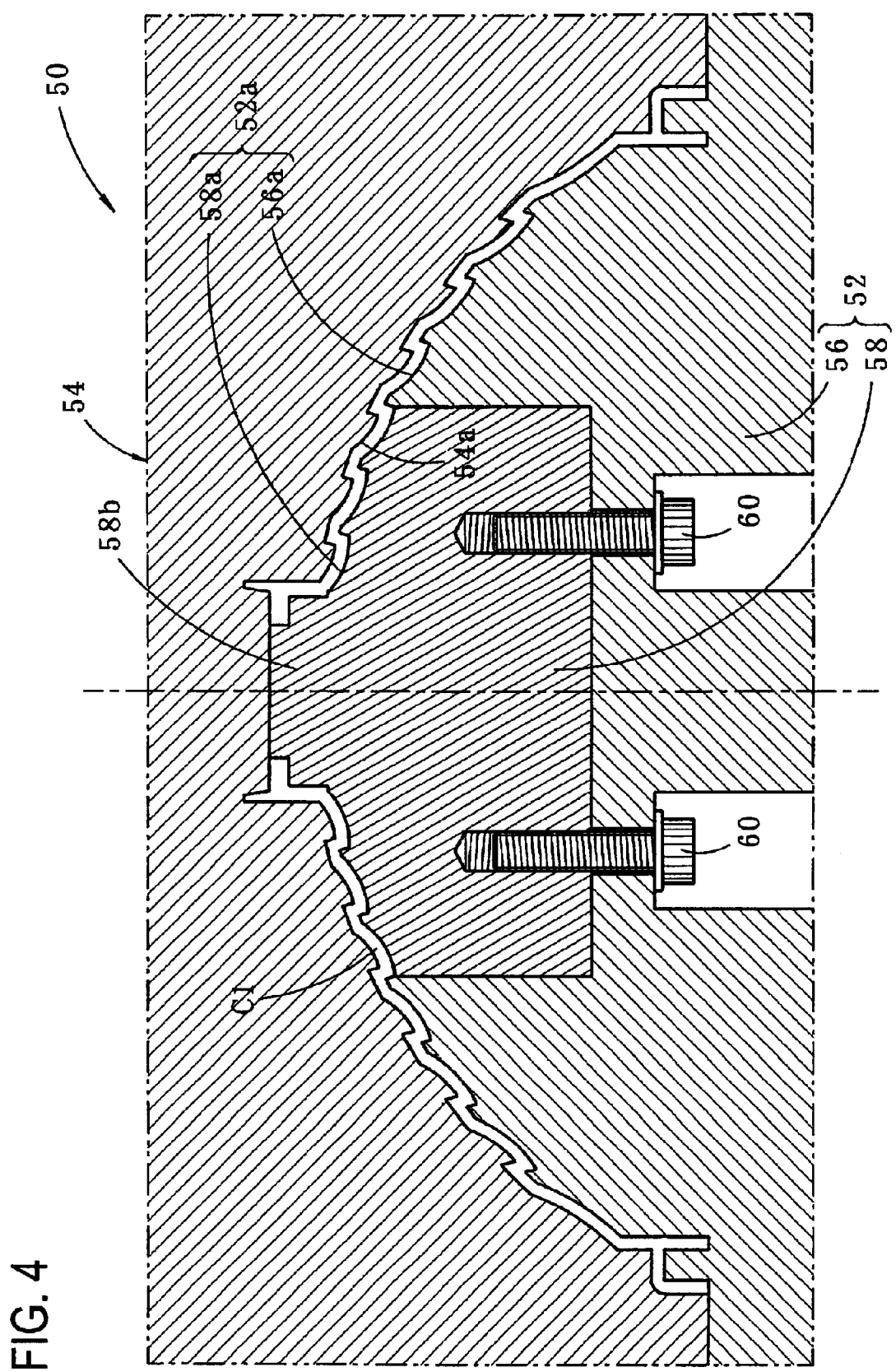
FIG. 4 is a cross-sectional view showing an injection mold to be used when manufacturing the lamp body of the aforementioned tail lamp by injection molding.

FIG. 4 is a cross-sectional view showing an injection mold 50 used in manufacturing the aforementioned lamp body 14 by injection molding.

As shown in the figure, the injection mold 50 is constituted by a fixed mold 52 and a movable mold 54 that together form a cavity C1 with a shape corresponding to the lamp body 14. The fixed mold 52 constitutes a cavity surface 52a on the inner side of the lamp body 14, and the movable mold 54 constitutes a cavity surface 54a on the outer side of the lamp body 14.

While the movable mold 54 is configured as a single mold, the fixed mold 52 is constituted by a mold body 56 and an insert 58 detachably attached to the mold body 56 via a bolt 60. Further, a part of the reflective surface 14a of the lamp body 14 and the bulb attachment hole 14c are molded with a cavity surface 58a of the insert 58.

Specifically, as shown in FIGS. 1 to 3, an insert-molded surface 14B of the lamp body 14 molded by the cavity surface 58a of the insert 58 defines the bulb attachment hole 14c and a portion 14a1 closer to the optical axis of the reflective surface 14a. The profile shape of the portion 14a1 closer to the optical axis is an oblong rectangular shape, and the position of the boundary between the portion 14a1 closer to the optical axis and the other portion 14a2 on the reflective surface 14a is substantially the same as the position of the boundary between each of the reflective element 14s.

In order to achieve this, as shown in FIG. 4, the position of the boundary between the cavity surface 58a of the insert 58 in the fixed mold 52 and the cavity surface 56a of the mold body 56 is also set at a position which is substantially the same as the position of the boundary between the reflective elements 14s.

Figure 5:
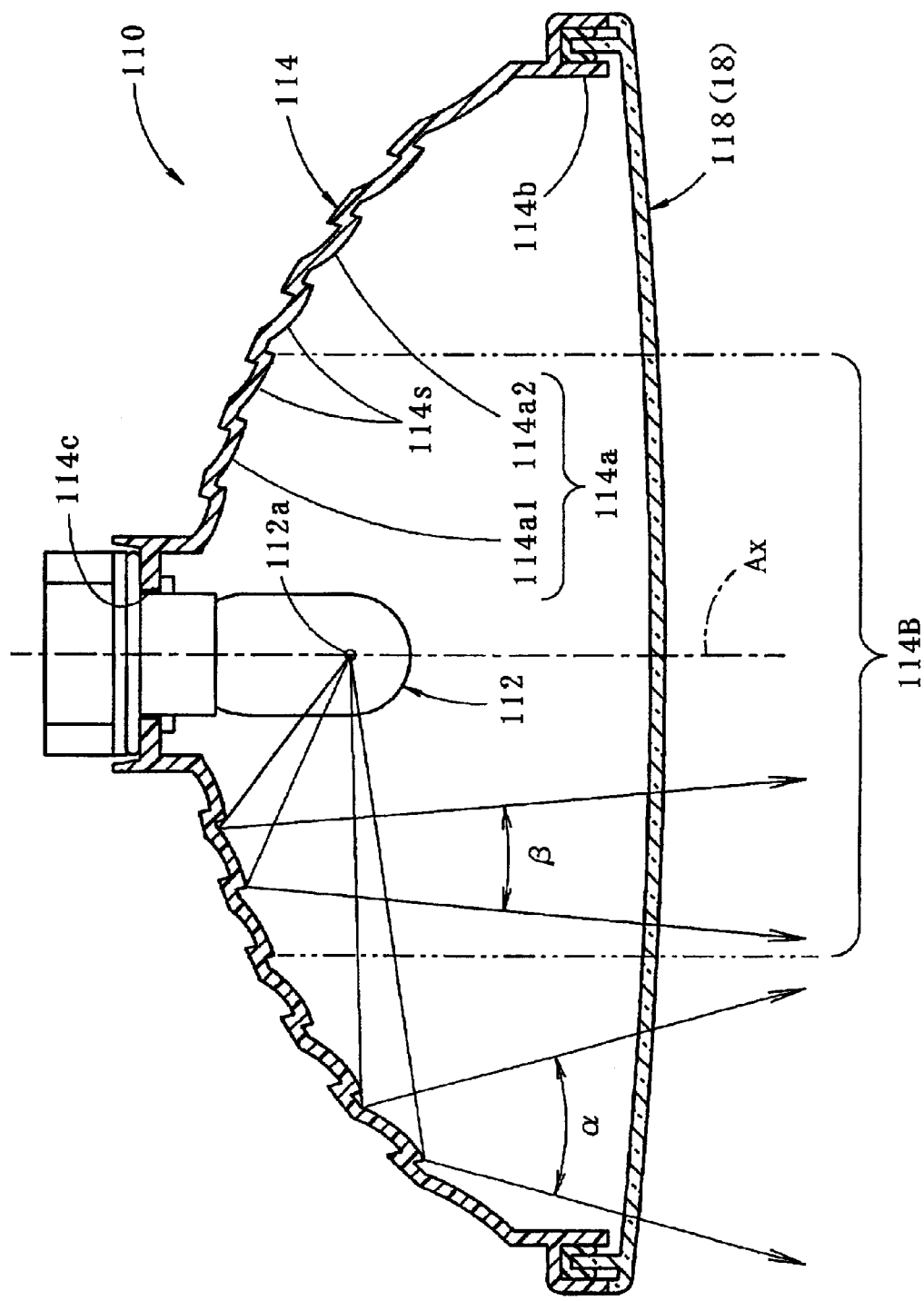
FIG. 5 is a horizontal cross-sectional view showing a rear fog lamp having the same appearance as the aforementioned tail lamp.

FIG. 5 is a horizontal sectional view showing a rear fog lamp 110 having the same appearance as that of the aforementioned tail lamp 10.

Like the tail lamp 10, the rear fog lamp 110 is also a lamp that emits red light. Therefore, the translucent cover 18 of the tail lamp 10 can be carried over to the translucent cover 118 without modification.

However, the rear fog lamp 110 irradiates light with a higher luminous intensity than the tail lamp 10, and therefore a light source bulb 112 with a higher output than the light source bulb 12 of the tail lamp 10 is used. In addition, a bulb attachment hole 114c with a shape suitable for attaching the light source bulb 112 is formed in the lamp body 114.

Further, the rear fog lamp 110 must irradiate light farther than the tail lamp 10, and therefore the lamp body 114 with a reflective surface 114a with right and left diffusion angles must be modified.

Specifically, each reflective element 114s constituting a portion 114a1 closer to the optical axis of the reflective surface 114a is set to have a larger radius of curvature in horizontal cross section than each reflective element 14s constituting the portion 14a1 closer to the optical axis of the tail lamp 10. Accordingly, light from a filament 112a of the light source bulb 112 at the right and left diffusion reflection angle β, which is smaller than the right and left diffusion reflection angle a of each reflective element 14s constituting the portion 14a1 closer to the optical axis of the tail lamp 10, is diffused and reflected forward.

Figure 6:
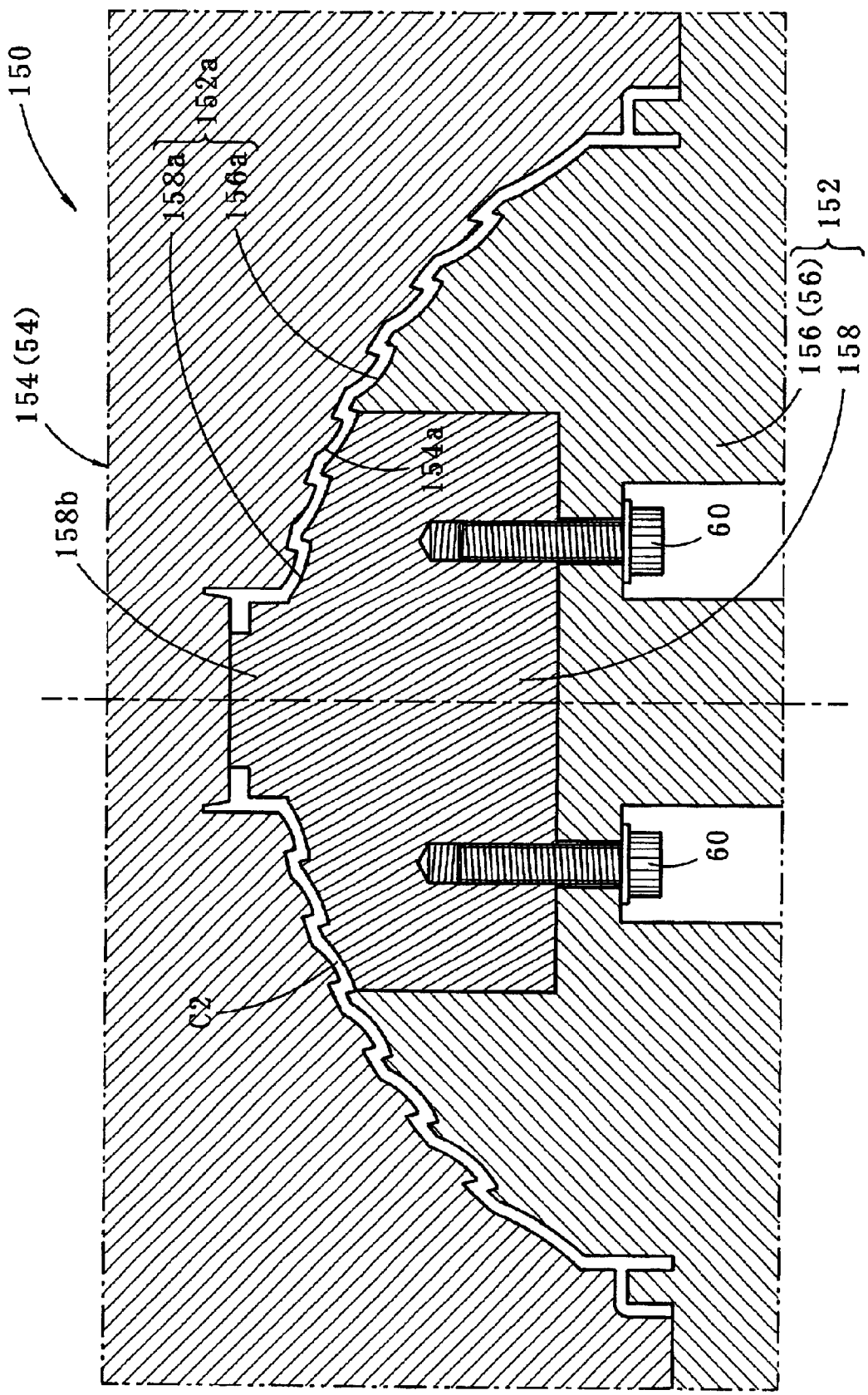
FIG. 6 is a sectional view showing an injection mold to be used when manufacturing the lamp body of the aforementioned rear fog lamp by injection molding.

FIG. 6 is a cross-sectional view showing an injection mold 150 that is used when manufacturing the lamp body 114 by injection molding.

As shown in FIG. 6, like the injection mold 50 for a tail lamp 50, the injection mold 150 is also constituted by a fixed mold 152 and a movable mold 154 that together form a cavity C2 with a shape corresponding to the lamp body 114. The fixed mold 152 constitutes a cavity surface 152a on the inner side of the lamp body 114, and the movable mold 154 constitutes a cavity surface 154a on the outer side of the lamp body 114.

The movable mold 154 is configured as a single mold, and the movable mold 54 of the injection mold 50 is carried over to the movable mold 154 without modification. On the other hand, the fixed mold 152 is constituted by a mold body 156 and an insert 158 detachably attached to the mold body 156 via a bolt 60. The mold body 156 of the injection mold 50 is carried over to the mold body 156 without modification. The insert 158 has the same peripheral shape as the insert 58 of the injection mold 50, but a cavity surface 158a thereof is slightly different from the cavity surface 58a of the insert 58.

Namely, the cavity surface 158a of the insert 158 has a larger radius of curvature in the horizontal cross section of a portion corresponding to each of the reflective element 14s of the portion 114a1 closer to the optical axis than the cavity surface 58a of the insert 58. Further, a portion corresponding to the bulb attachment hole 114a has a slightly different shape from that of the cavity surface 58a of the insert 58.

The main structure of the injection mold 50 and that of the injection mold 150 can be the same. Therefore, by switching the insert 58 with the insert 158 by attaching and detaching the bolt 60, it is possible to selectively injection mold the lamp body 14 for the tail lamp 10 and the lamp body 114 for the rear fog lamp 110.

As above described in detail, in the tail lamp 10, which is a vehicular lamp according to the present invention, the lamp body 14 thereof is constituted by an injection-molded product that includes a reflective surface 14a for reflecting light from the light source bulb 12 forward and which is formed with the bulb attachment hole 14c for attaching the light source bulb 12. Further, a portion of the reflective surface 14a of the lamp body 14 (i.e., the portion 14a1 closer to the optical axis) is constituted by the insert-molded surface 14B molded by the cavity surface 58a of the insert 58 constituting a part of the fixed mold 52 of the injection mold 50.

With this construction, the following effects can be obtained.

By performing injection molding using the insert 158 with the cavity surface 158a with a different shape from the cavity surface 58a of the insert 58, it is possible to manufacture the lamp body 114 having a reflective surface with a different shape in part than the lamp body 14 by using the injection mold 150 to which the main structure of the injection mold 50 is carried over. Therefore, unlike the conventional case, it is possible to obtain the lamp body 14 for the tail lamp 10 and the lamp body 114 for the rear fog lamp 110 without the necessity of providing a separate reflector.

Therefore, when manufacturing the lamp body 14 for the tail lamp 10 and the lamp body 114 for the rear fog lamp 110 by injection molding, it is possible to reduce the cost of manufacturing the lamp by making the injection molds 50, 150 common, and it is also possible to reduce the cost of the lamp by eliminating the necessity of increasing the number of parts.

Particularly, in this embodiment, the bulb attachment holes 14c, 114c are also constituted by the insert-molded surfaces 14B, 114B. Therefore, the light source bulbs 12, 112 of different types can be attached to the lamp body 14 for the tail lamp 10 and the lamp body 114 for the rear fog lamp 110. Further, with this configuration, since protruding portions 58b, 158b are formed on the inserts 58, 158, it is possible to easily attach and detach the inserts 58, 158.

Still further, in this embodiment the reflective surfaces 14a, 114a of the lamp bodies 14, 114 are constituted by the plurality of reflective elements 14s, 114s. Therefore, even if only the shapes of the insert-molded surfaces 14B, 114B are changed, the changes in shapes are changes in the unit of each reflective element 14s, 114s. Therefore, unlike the case where the reflective surfaces 14a, 114a of the lamp bodies 14 and 114 are constituted by a smooth curved surfaces, it is possible to prevent the basic thickness of the lamp bodies 14, 114 from being greatly changed. Accordingly, the occurrence of shrinkage in the reflective surfaces 14a, 114a and a decrease in flowability of molten resin during injection molding can be effectively reduced.

Further, in this embodiment the positions of the boundaries between the portions 14a, 114a1 closer to the optical axis on the reflective surfaces 14a, 114a (i.e., the insert-molded surfaces 14B, 114B) and the other portions 14a2, 114a2 are substantially the same as the positions of the boundaries between each reflective elements 14s, 114s. Therefore, the profiles of the inserts 58, 158 formed on the reflective surfaces 14a, 114a can be made less conspicuous.

Further, according to the invention the main structure of the injection molds 50, 150 for injection molding the lamp bodies 14, 114 is shared by the tail lamp 10 and the rear fog lamp 110 of which the translucent cover 18 is constituted by a red-colored translucent cover. Therefore, by switching the inserts 58, 158 with each other, the desired distribution performance for each type of lamp can be ensured based on the shared use of the translucent cover 18.

In the above-described embodiment, examples where the inserts 58, 158 are provided in the fixed molds 52, 152 of the injection molds 50, 150 were explained. However, also in cases where inserts are provided in the movable molds 54, 154, effects similar to those of this embodiment can be obtained if shapes on the inner side of the lamp bodies 14, 114 are formed by the cavity surfaces of the movable molds 54, 154.

Sharing of the injection molds 50, 150 between the tail lamp 10 and the rear fog lamp 110 was explained. However, as in the case of the tail lamp 10 and the rear fog lamp 110, and also for a tail and stop lamp with a red translucent cover, or a dummy lamp with a red translucent cover (a lamp without a light source bulb) and the like, it is also possible to share the injection mold based on the shared use of the translucent cover 18.

Further, even between lamps with translucent covers of different colors, effects similar to those of this embodiment can be obtained by adopting a configuration similar to that of this embodiment, with the exception of sharing of the translucent cover.

It should further be apparent to those skilled in the art that various changes in form and detail of the invention as shown and described above may be made. It is intended that such changes be included within the spirit and scope of the claims appended hereto.

What is claimed is:

1. An injection mold for a lamp body for use in manufacturing by injection molding a lamp body of a vehicular lamp which includes a reflective surface for reflecting light from a light source bulb forward and which is formed with a bulb attachment hole for mounting said light source bulb on said lamp body, comprising a fixed mold and a movable mold for forming a cavity with a shape corresponding to said lamp body, one of said fixed and movable molds comprising a mold body and an insert detachably attached to said mold body, a part of said reflective surface being molded by a cavity surface of said insert, wherein said bulb attachment hole is formed by said cavity surface of said insert.

2. The injection mold for a lamp body according to claim 1, wherein said reflection surface comprises a plurality of reflective elements, and a position of a boundary between said cavity surface of said insert and a cavity surface of said mold body is substantially the same as a position of a boundary between adjacent ones of said reflective elements.

3. A manufacturing method for injection molding a lamp body of a vehicular lamp which includes a reflective surface for reflecting light from a light source bulb forward, and which is formed with a bulb attachment hole for mounting said light source bulb, comprising the steps of:

configuring a fixed mold and a movable mold for forming a cavity with a shape corresponding to said lamp body with an insert being detachably attached to one of said fixed mold and said movable mold, and molding said lamp body in said cavity and comprising molding a part of said reflective surface with a cavity surface of said inserts, wherein said bulb attachment hole is formed with said cavity surface of said insert.

4. The manufacturing method for a lamp body according to claim 3, comprising providing a plurality of different inserts in accordance with respective different types of vehicular lamps.

5. The manufacturing method for a lamp body according to claim 3, wherein said reflective surface comprises a plurality of reflective elements, and wherein a position of a boundary between said cavity surface of said insert and a cavity surface of said mold body is substantially the same as a boundary between adjacent ones of said reflective elements.

* * * * *